US011986123B2

(12) United States Patent
Bruggink et al.

(10) Patent No.: US 11,986,123 B2
(45) Date of Patent: May 21, 2024

(54) DEVICE FOR DELIVERING HOT WATER AND STEAM

(71) Applicant: VERSUNI HOLDING B.V., Eindhoven (NL)

(72) Inventors: Wilhelmus Hendrikus Maria Bruggink, Eindhoven (NL); Anke Gerda Sinnema, Eindhoven (NL)

(73) Assignee: VERSUNI HOLDING B.V., Eindhoven (NL)

(*) Notice: Subject to any disclaimer, the term of this patent is extended or adjusted under 35 U.S.C. 154(b) by 0 days.

(21) Appl. No.: 18/268,851

(22) PCT Filed: Dec. 17, 2021

(86) PCT No.: PCT/EP2021/086673
§ 371 (c)(1),
(2) Date: Jun. 21, 2023

(87) PCT Pub. No.: WO2022/136198
PCT Pub. Date: Jun. 30, 2022

(65) Prior Publication Data
US 2023/0389749 A1    Dec. 7, 2023

(30) Foreign Application Priority Data
Dec. 21, 2020    (EP) .................................... 20216008

(51) Int. Cl.
*A47J 31/60* (2006.01)
*A47J 31/46* (2006.01)

(52) U.S. Cl.
CPC ........... *A47J 31/605* (2013.01); *A47J 31/469* (2018.08)

(58) Field of Classification Search
None
See application file for complete search history.

(56) References Cited

U.S. PATENT DOCUMENTS

| 2013/0055902 | A1* | 3/2013 | Berto | A47J 31/542 |
| | | | | 392/397 |
| 2015/0245736 | A1* | 9/2015 | Reyhanloo | A47J 31/605 |
| | | | | 99/280 |
| 2019/0357722 | A1* | 11/2019 | Taylor | C02F 1/283 |
| 2023/0056272 | A1* | 2/2023 | Zuidervaart | C02F 1/42 |
| 2023/0108978 | A1* | 4/2023 | Koefod | C02F 5/08 |
| | | | | 210/198.1 |

FOREIGN PATENT DOCUMENTS

| CN | 1304883 A | * 7/2001 | .......... C02F 1/46104 |
| CN | 201764667 U | 3/2011 | |

(Continued)

OTHER PUBLICATIONS

Extended European Search Report issued in connection with corresponding EP Application No. 20216008.1 dated May 10, 2021.

*Primary Examiner* — John J Norton
(74) *Attorney, Agent, or Firm* — Maschoff Brennan (57) ABSTRACT

A device has a water heating system, a first output for delivering hot water and a second output for delivering steam. A first hydraulic circuit with a first filter supplies the first output and a second hydraulic circuit with a second filter supplies the second output. The first filter comprises a scale inhibitor filter and the second filter comprises an ion exchange filter.

15 Claims, 3 Drawing Sheets

(56) References Cited

FOREIGN PATENT DOCUMENTS

| | | | | |
|---|---|---|---|---|
| CN | 102665877 | A | | 9/2012 |
| CN | 103889289 | A | | 6/2014 |
| CN | 106573812 | A | | 4/2017 |
| CN | 110099592 | A | | 8/2019 |
| CN | 111689619 | A | * | 9/2020 |
| CN | 111820749 | A | | 10/2020 |
| DE | 102005007922 | A1 | | 8/2006 |
| DE | 102010022954 | A1 | | 12/2010 |
| EP | 3141529 | A1 | | 3/2017 |
| JP | H04-259417 | A | | 9/1992 |
| WO | WO-2005048793 | A1 | * | 6/2005 .......... A47J 31/0576 |
| WO | WO-2013151618 | A2 | * | 10/2013 ............. B01D 61/48 |
| WO | WO-2016094027 | A1 | * | 6/2016 ................ C02F 1/42 |
| WO | 2016180647 | A1 | | 11/2016 |
| WO | 2018083498 | A1 | | 5/2018 |

* cited by examiner

DEVICE FOR DELIVERING HOT WATER AND STEAM

CROSS-REFERENCE TO RELATED APPLICATIONS

The present application is a U.S. National Phase application under 35 U.S.C. § 371 of International Application No. PCT/EP2021/086673, filed on Dec. 17, 2021, which claims the benefit of European Patent Application No. 20216008.1, filed on Dec. 21, 2020. This application is hereby incorporated by reference herein.

FIELD OF THE INVENTION

This invention relates to devices which generate both hot water and steam. Such devices may be used within domestic appliances for domestic cleaning, such as steam cleaners, for garment care, such as steam irons or steamers, or for beverage production, such as coffee machines.

BACKGROUND OF THE INVENTION

There many different types of domestic appliance that heat water to generate both hot water for one purpose and steam for another purpose. This applies to garment cleaning or treatment and to beverage preparation.

When drinking water is heated up to elevated temperatures or even taken to boiling, Ca and Mg ions will start to precipitate from the water by forming sparingly soluble salts like carbonates, sulphates, hydroxides etc. This irreversible precipitation can settle on the interior of piping, valves, venturies, orifices and other components or parts present in the water flow path.

The scale formation or calcification may cause fluid lines to become blocked and/or heating elements to become insulated. This in turn may result in longer processing times, decreased functional performance and finally even to malfunctioning of the device. It may also result in visual contamination. For instance, in steam irons, scaling may lead to brownish colored water being spat onto garments.

To prevent scaling problems in these type of machines, it is known to use ion exchange filters. Such filters may be designed to filter out all scale forming ions and minerals from the water, but this may negatively affect some of the water properties (e.g. for a coffee machine: taste and coffee extraction properties).

Also, due to gradual depletion of the filter, the content of the scale-forming ions in the filtered water may slowly increase over time. Thus, in most cases, the filtered water will continue to include some scale-forming ions.

It is therefore known to combine or replace the ion exchange filter with a scale inhibitor filter, e.g. a filter based on poly-phosphates or poly-phosphonates. The scale inhibitor filter does not filter out scale-forming ions, so does not prevent the formation of calcium crystals, but it blocks further growth thereof. The resulting calcium crystals remain very small, so that they are transported through the hydraulic circuit, suspended in the water.

WO 2016/180647 discloses a device in which a small amount of scale inhibitor is added to the water, to prevent the formation of large-scale particles. The device further comprises a scale inhibitor absorbent for absorbing the inhibitor before leaving the outlet, to prevent outflow of (undesired) scale inhibitor in the water. The absorbent may absorb the inhibitor based on for instance physisorption (physical adsorption), capillary condensation and/or chemisorption.

This solution functions well in devices that use hot water only, but functions less well in appliances that also use steam. In such devices, most of the water that may carry the scale particles and crystals through the device (when delivering hot water), will have evaporated in the steam mode. As a result, transport of at least part of the scale crystals may be hampered, and these crystals may settle onto the inner surface of the heater or at locations further downstream of the heater. In time, the deposition of scale may grow and may start blocking the flow of water or steam. Furthermore, over time, scale chippings may become detached again, for example when the temperature of the heater is changed, for example lowered to produce hot water, due to thermal stresses.

The resulting scale particles have a larger magnitude (in the order of 1 mm). These particles will still be carried along by the hot water, but may build up in the first restriction that they encounter (e.g. a valve), ultimately resulting in failure of such a valve.

WO 2018/083498 discloses a filter system for example for use in a bean to cup coffee machine. It relates to a system with separate hot water boiler and steam boiler. The water supply passes through a first filter, such as an activated carbon filter, before entering either boiler, for removing particulates, carbonate ions and organic compounds. The water for the steam boiler only also passes through a second filter, such as a sodium cation exchange filter, for replacing calcium and magnesium ions with sodium ions.

There remains a need for an effective scale inhibiting or scale filtering arrangement which is suitable for a device which generates steam and hot water.

SUMMARY OF THE INVENTION

The invention is defined by the claims.

According to examples in accordance with an aspect of the invention, there is provided a device, comprising:
- a source of water;
- a water heating system for heating water from the source of water;
- a flow control system for controlling a flow of water from the source of water;
- a first output for delivering hot water;
- a second output for delivering steam;
- a first hydraulic circuit extending from the source of water to the first output, comprising a first filter; and
- a second hydraulic circuit extending from the source of water to the second output, comprising a second filter,
- wherein the first filter comprises a scale inhibitor filter and the second filter comprises an ion exchange filter.

The first, scale inhibitor, filter is in the hot water hydraulic circuit. It is used to inhibit the growth of calcium crystals. The small crystals can easily be transported through the hot water hydraulic circuit, suspended in the water, without settling down on any surface or restriction.

The second, ion exchange, filter is in the steam hydraulic circuit. It can be designed to remove all scale-forming ions because there are no restrictions, e.g. relating to taste or coffee extraction properties, since the steam is typically not for consumption. It is for example used for milk heating and frothing or for cleaning purposes. Since substantially all scale-forming ions can be removed, there is no need for an additional inhibitor filter in the steam hydraulic circuit.

The scale inhibitor filter may be only in the first (hot water) hydraulic circuit. Thus, it is designed only for its function in the hot water circuit.

Additionally, or alternatively, the ion exchange filter may be only in the second (steam) hydraulic circuit. Thus, it is designed only for its function in the steam circuit. However, the first hydraulic circuit may nevertheless still include its own ion exchange filter.

With this solution, consumers do not need to descale at all when using the correct filters.

The device is preferably part of a domestic appliance, which makes use of hot water and steam in the normal functions of the appliance. Note that the second output may also be used for delivering hot water, for example for tea making in the case of a beverage machine.

The source of water for example comprises a single water reservoir.

There could be separate water reservoirs for the steam generation and the hot water generation, but preferably a single reservoir is provided as this is more convenient for the user of the device.

Furthermore, a plumbed-in system, i.e. a tap water system using tap water pressure, may have an external water supply, in which case the source of water may then simply comprise a water inlet to the device. The flow control system may comprise a pump or pumps, but it could in such a case comprise a flow regulator if the pressure of the external water supply is relied upon.

The flow control system may comprise a pump which is shared between the first and second hydraulic circuits. This reduces the number of components needed to implement the two hydraulic circuits.

The first and second filters may be part of a filter unit which is downstream of the pump, the filter unit having:
 a first water input and a first water output for the first filter; and
 a second water input and a second water output for the second filter,
 wherein the device further comprises a flow control valve as well as the pump between the water source and the filter unit.

The flow control valve can route pumped water from the source of water to a selected one of the filters.

The flow control system may instead comprise a first pump in the first hydraulic circuit and a second pump in the second hydraulic circuit.

The use of separate pumps simplifies the creation of separate hydraulic circuits. The heating is preferably downstream of the pumps.

The water heating system may comprise a heater which is shared between the first and second hydraulic circuits.

This reduces the number of components needed to implement the two hydraulic circuits. A single heater may be switched between a water heating mode and a steam generation mode. The heater may for example be emptied of residual water each time the heater is switched to the steaming mode, to make sure that the water used for steaming is ion free.

The water heating system may comprise a first heater in the first hydraulic circuit and a second heater in the second hydraulic circuit.

This avoids the need to switch the heater between different modes and different water paths. Each heater is then dedicated to heating water which has been filtered in the desired manner for the hydraulic circuit of that particular heater.

The first and second filters may be part of a filter unit which is removable from the device, having a single water input and first and water second outputs downstream of the first and second filters, respectively. The filter unit for example has separate compartments for the two filters, so they can be replaced independently.

The first and second filters may instead be separate filter units which are each removable from the device, each with a respective water input and a respective water output downstream of the filter.

The first filter may instead be a built-in filter not intended for replacement by the user of the device and the second filter is removable from the device, wherein each filter has a respective water input and a respective water output downstream of the filter.

Alternatively, the first and second filters are built-in filters not intended for replacement by a user of the device.

Thus, there are different possible configurations of the two filters. They may be permanent or replaceable.

As mentioned above, the first hydraulic circuit may further comprises an ion exchange filter material.

By adding an ion exchange filter (or adding ion exchange material into a filter) within the hot water circuit, the water taste and/or extraction properties may be improved. This is of particular interest for a beverage machine.

The device may comprise a domestic appliance selected from the group consisting of a coffee maker, an espresso machine, a cappuccino maker, each having a coffee brew circuit, wherein the first output is used for the coffee brew circuit and the second output is used for delivering steam or for delivering hot water for non-coffee beverages.

The first and second outputs of the device are not necessarily the eventual user outputs from the domestic appliance; they may be internal flow passages where steam and water are delivered, for further processing (e.g. coffee brewing) before forming an eventual output to the user of the appliance.

In the case of a coffee, cappuccino or espresso machine, the appliance has one hydraulic circuit dedicated to making coffee, and one hydraulic circuit dedicated to making steam. Scale formation in the system can thus be prevented while keeping good water quality for making coffee. The inhibitor filter material maintains ions in the water (for good coffee extraction in the brewing process) but still prevents limestone formation in the hot water circuit. The ion exchange filter in the steam circuit removes the scale forming ions from the water.

The ion exchange filter may comprise an ion exchange polymer resin filter; and the scale inhibitor filter may comprise a food approved scale inhibitor comprising a polyphosphate or poly-phosphonate compound.

The invention also provides a method of generating hot water and steam, comprising:
 controlling a flow of water from a source of water to a water heating system;
 delivering hot water from a first output using a first hydraulic circuit which extends from the source of water to the first output, wherein the first hydraulic circuit comprises a first filter; and
 delivering steam from a second output using a second hydraulic circuit extending from the source of water to the second output, wherein the second hydraulic circuit comprises a second filter,
 wherein the first filter comprises a scale inhibitor filter and the second filter comprises an ion exchange filter.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a device having a water heating system, a first output for delivering hot water and a second output for delivering steam. A first hydraulic circuit with a first filter supplies the first output and a second hydraulic circuit with a second filter supplies the second output. The first filter comprises a scale inhibitor filter and the second filter comprises an ion exchange filter.

The invention may be applied to any device which heats water to generate steam and also to generate hot water, for delivery from different outputs (internal or external).

One example is an espresso machine, such as a full automatic espresso appliances. Such machines provide the function of automated cappuccino brewing, in which coffee is brewed, and frothed milk is prepared. In most cases, steam is used for heating and frothing the milk, in a similar manner to a barista. The milk frothing function typically operates by heating up water in a thermoblock within the coffee machine to generate steam, which then passes to a milk frothing unit. The frothed milk is used for milk recipes generally, and a cappuccino is one example.

Figure 1A:
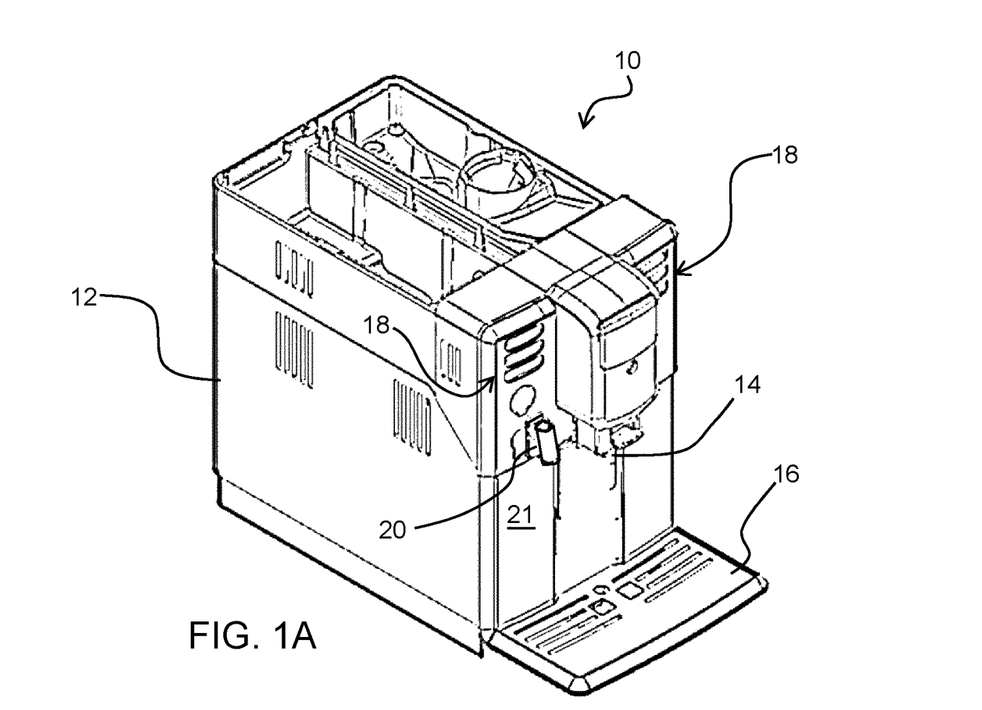
FIGS. 1A and 1B show a known espresso coffee machine.
Figure 1B:
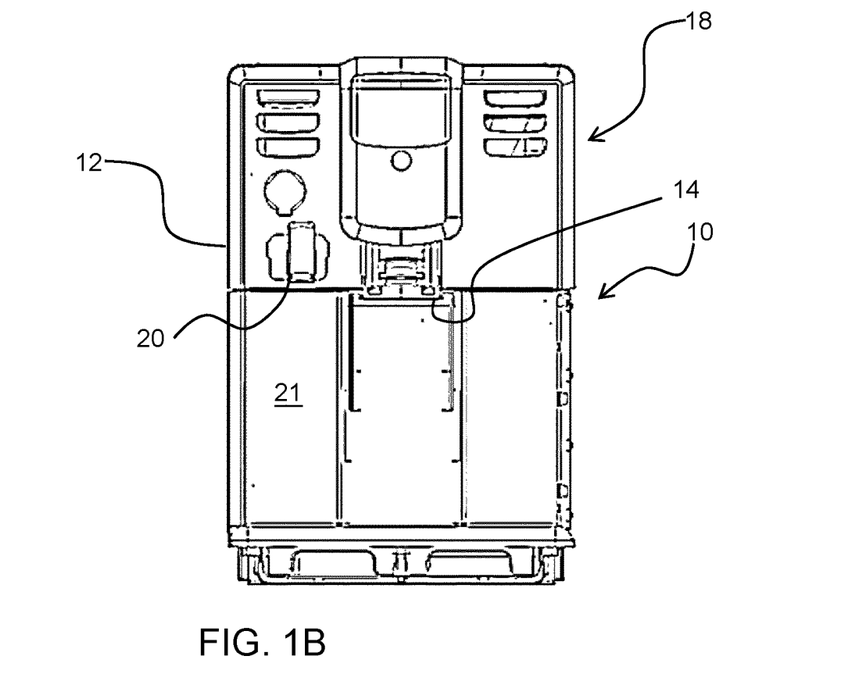

FIGS. 1A and 1B show an example of an espresso coffee machine 10. FIG. 1A shows a perspective view and FIG. 1B shows a view from in front. This example is a bean-to-cup machine, although other options are possible.

The coffee machine comprises a main body 12 which houses a water reservoir, a water heater and a reservoir for receiving coffee beans. There is an internal grinding mechanism for creating coffee grind, a brewing chamber or brew group for receiving the coffee grind, and a pumping system for pumping heated water through the coffee grind.

The coffee machine comprises a coffee output 14 from which the espresso drink (without milk) is output. The coffee output 14 faces downwardly and is located over a drip tray 16. FIGS. 1A and 1B also show a user interface 18 for receiving user selections, such as for water selection and for other drinks selections. At least some of the drinks selections relate to drinks recipes which include frothed milk and therefore require the generation of steam. There may also be an option for the generation of steam without being part of a drink selection, for example to enable the user to generate heated and/or frothed milk independently of any drink to be made by the machine.

The operation of the machine in generating an espresso coffee drink is entirely conventional, and the general operation of the coffee machine will not be described further. Furthermore, the illustrated full function espresso machine is only one example of a type of coffee machine to which the invention may be applied.

An output nozzle 20 is provided for delivering the steam for milk frothing or hot water, depending on user selection at the user interface 18. The steam output may be used for heating and/or frothing milk, and the option of a hot water only output gives additional options to the user, for example for making soup, tea, hot chocolate etc.

There is a separate steam circuit and hot water circuit, either leading to a shared output nozzle or else leading to separate output nozzles for steam and for hot water. These separate circuit comprise their own fluid passageways, control valves etc., and they may have different heaters or they may share the same heater.

The output nozzle 20 is located in a docking region 21 for receiving a drinks vessel or a milk frothing unit.

Figure 2:
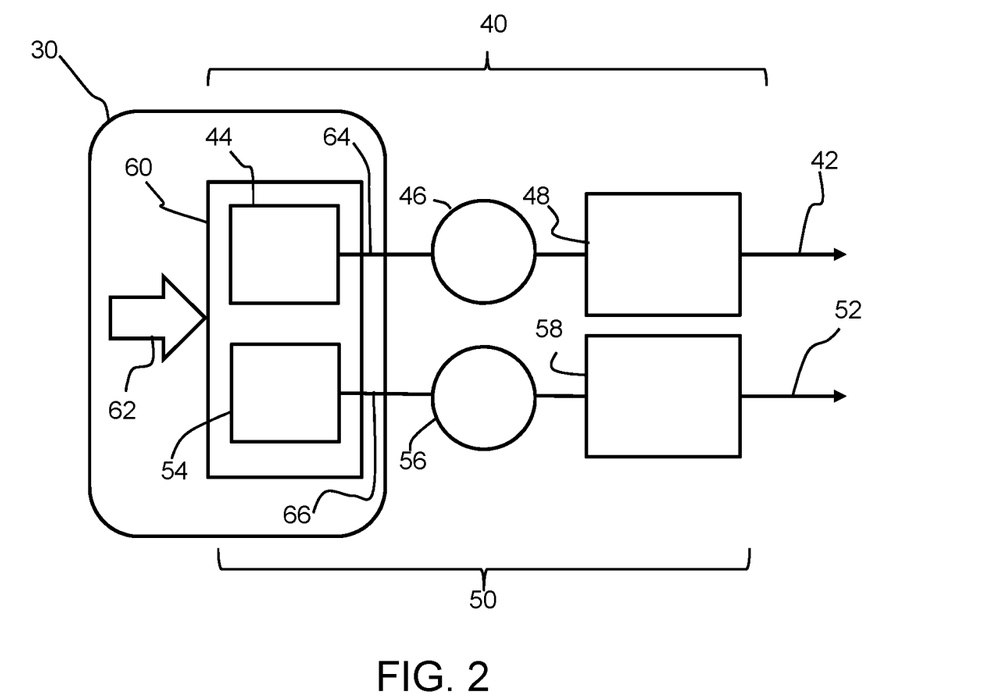
FIG. 2 shows a first example of a hydraulic circuit for use in a device according to the invention.

FIG. 2 shows a first example of a hydraulic circuit for use in a device according to the invention. The device may be a coffee machine such as described above, or it may be any other device for generating hot water and steam.

The hydraulic circuit comprises a source 30 of water. In the examples shown, this source of water is a single water reservoir. However, it may instead be an inlet from an external source, such as a mains tap or other water reservoir external to the device. Furthermore, there could be separate water reservoirs for steam generation and for hot water generation.

There is a water heating circuit 40 with a first output 42 for delivering hot water and a steam circuit 50 with a second output 52 for delivering steam. The water heating circuit is a first hydraulic circuit extending from the water reservoir 30 to the first output 42. It includes a first filter 44. The steam circuit is a second hydraulic circuit extending from the water reservoir 30 to the second output 52. It includes a second filter 54.

The first filter 44 is only in the first hydraulic circuit and is thus selected for its function in the water heating circuit. The second filter is only in the second hydraulic circuit. Thus, it is designed only for its function in the steam circuit.

A flow control system controls a flow of water from the water reservoir 30. For this purpose, FIG. 2 shows a first pump 46 for the water heating circuit 40 and a second pump 56 for the steam circuit 50.

In the example of FIG. 2, each of the two hydraulic circuits has its own water heater 48, 58, each for heating water from the water reservoir. This avoids the need to switch the heating function between different modes and different water paths. Each heater 48, 58 is then dedicated to heating water which has been filtered in the desired manner for the hydraulic circuit of that particular heater.

The first filter 44 comprises a scale inhibitor filter and the second filter 54 comprises an ion exchange filter. The first, scale inhibitor, filter 44 is thus in the hot water hydraulic circuit. It is used to inhibit the growth of calcium crystals. The small crystals can easily be transported through the hot water hydraulic circuit, suspended in the water, without settling down on any surface or restriction.

The second, ion exchange, filter 54 is in the steam hydraulic circuit. It can be designed to remove all scale-forming ions because there are no restrictions, e.g. relating to taste or coffee extraction properties, since the steam is typically not for consumption. It is for example used for milk heating and frothing or for cleaning purposes. Since substantially all scale-forming ions can be removed, there is no need for an additional inhibitor filter in the steam hydraulic circuit.

This arrangement means consumers do not need to descale at all when using the correct filters.

The heaters may for instance each comprise a flow-through heater, a thermoblock, a heating plate, or a boiler. They may be of the same type or they may be of different types. Furthermore, a shared water heater could instead provide heat to both circuits in other examples, with thermal coupling to both circuits. Such a single heater may be switched between a water heating mode and a steam generation mode. The heater may for example be emptied of residual water each time the heater is switched to the steam mode, to make sure that the water used for steaming is ion free.

FIG. 2 shows a first example in which the first and second filters 44, 54 are part of a filter unit 60 which is received in the water reservoir, or is downstream of the water reservoir, with a single flow input 62 and separate flow outputs 64, 66. These flow outputs feed into the respective hydraulic circuits. The circuits for example then comprise their own pump and heater as explained above.

The filter unit 60 is for example a replaceable unit. The two filters may be replaced together or they may be replaceable individually, and housed in their own respective compartments within the overall filter unit.

Figure 3:
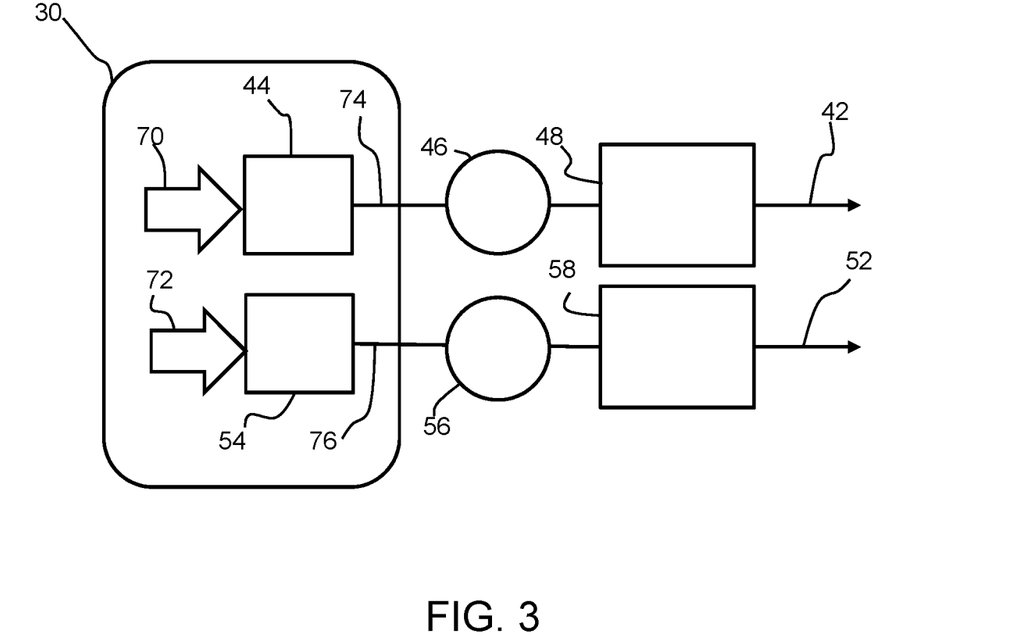
FIG. 3 shows a second example of a hydraulic circuit for use in a device according to the invention.

FIG. 3 shows an alternative design in which the first and second filters 44, 54 are separate units, each with their own flow input 70, 72 and flow output 74, 76. They again feed into the separate hydraulic circuits.

The first and second filters may each be removable independently from their location within the device, e.g. within the water reservoir.

Figure 4:
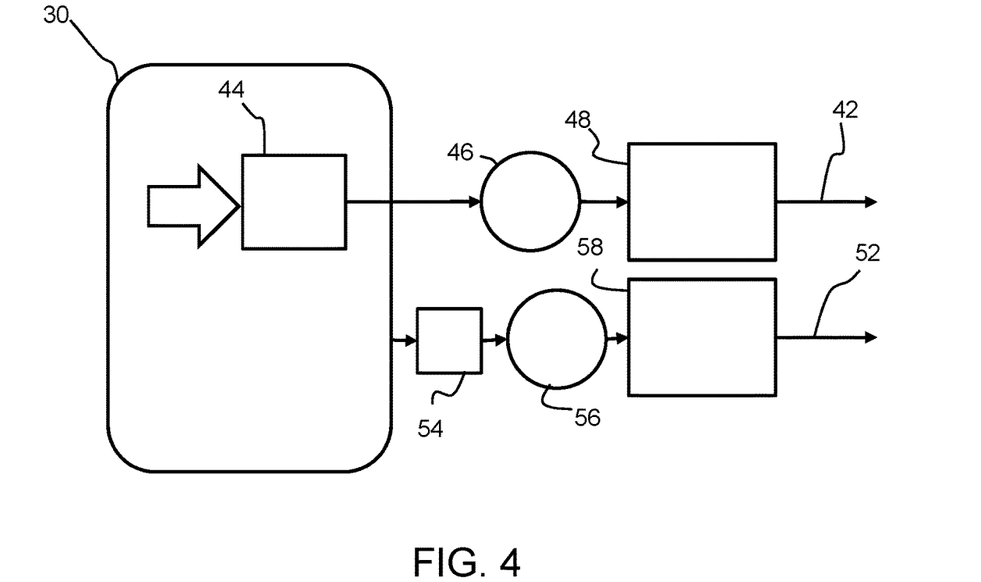
FIG. 4 shows a third example of a hydraulic circuit for use in a device according to the invention.

FIG. 4 shows an alternative design in which the first filter 44 is a fixed unit for example in the water reservoir 30, but the second filter 54 is a replaceable unit outside the water reservoir. The scale inhibiter material of the first filter 44 is used in low quantities, so a fixed scale inhibitor filter may be formed directly in the hot water circuit (before the heater) and remain in place. The ion exchange filter is in this example a replaceable filter, for example fitted to the water reservoir output that leads to the steam circuit. The water reservoir thus has two water outputs.

Figure 5:
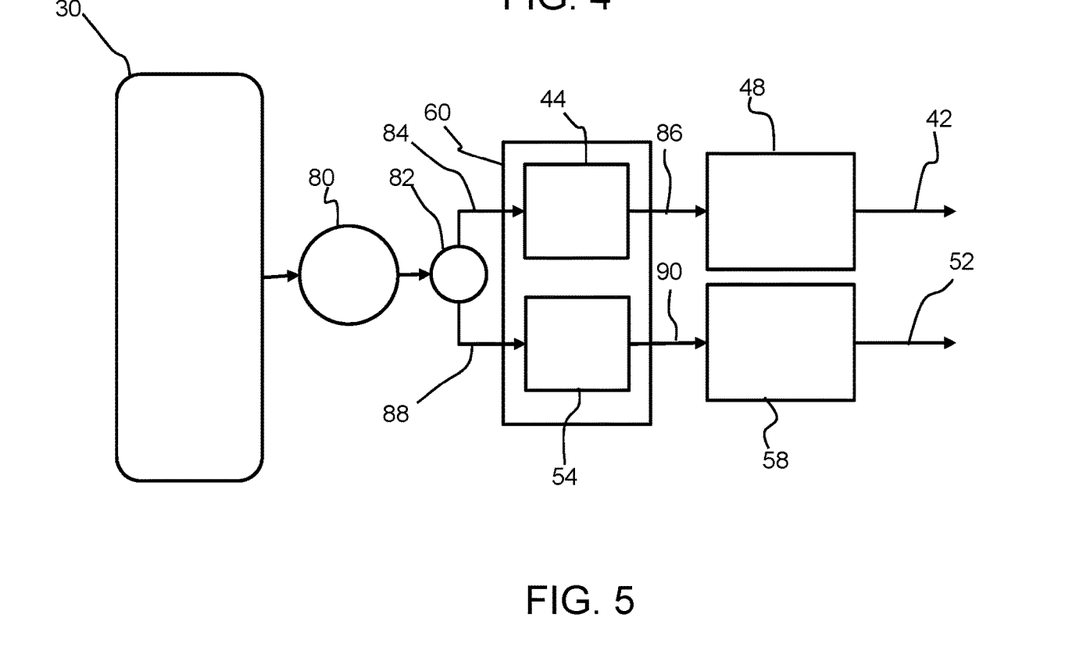
FIG. 5 shows a fourth example of a hydraulic circuit for use in a device according to the invention.

FIG. 5 shows another alternative design in which the first and second filters 44, 54 are again part of a filter unit 60 but which is downstream of a single pump 80 which is shared between the first and second hydraulic circuits. This reduces the number of components needed to implement the two hydraulic circuits.

The filter unit has a first water input 84 and a first water output 86 for the first filter and a second water input 88 and a second water output 90 for the second filter.

A flow control valve 82 downstream of the pump 80 can selectively divert water flow to one or other of the hydraulic circuits. The water reservoir 30 in this case only has one output.

Different combinations of replaceable and fixed filters are outlined above. The first and second filters may even both be built-in filters not intended for replacement by a user of the device.

The first hydraulic circuit 40 may additionally comprise an ion exchange filter material. By adding an ion exchange filter (or adding ion exchange material into a filter) within the hot water circuit, the water taste and/or extraction properties may be improved. This is of particular interest for a beverage machine.

The invention is of interest for any domestic appliance which generates steam and hot water. Examples include coffee makers as described above, but may also include also steam irons, a steam cleaner, a steam generating device more generally, a food steamer, a steam cleaner, a tea maker, a hot chocolate maker, a beverage dispenser, a soup maker, a water cooker, and an air humidifier.

The domestic appliance may be an electronic domestic appliance, including e.g. an electronic heating unit and optionally other functionalities. A domestic appliance may be defined as a piece of (electrical) equipment used in the home, especially in the kitchen. Domestic appliances may, however, also be used in offices. In general, domestic appliances are not industrial appliances, but may include relatively small units, including e.g. portable units.

The filter designs themselves are known. For example, an ion exchange filter may comprise an ion exchange polymer resin filter; and a scale inhibitor filter may comprise a food approved scale inhibitor comprising a poly-phosphate or poly-phosphonate compound.

Known scale inhibitors are sometimes referred to as a "descaling agent" or a "descalant" or an "inhibitor". Scale inhibitors like poly-phosphates and phosphonates are well known for their scale inhibiting properties. They are widely applied in the food processing and drinking water industry. Many different types of scale inhibitor exist. Most common types contain either inorganic phosphate or organic phosphate. Organic phosphates, a synthetic inhibitor, often denoted as phosphonates, show a superior anti scaling performance over a broad temperature and water quality range. A typical example is hydroxy-ethylidene 1,1-di-phosphonic acid or its corresponding salt. This phosphonate inhibitor is stable and effective at temperatures (even) above 100° C.

In a specific example, the scale inhibitor may comprise one or more of HEDP (1-hydroxy(ethane-diphosphonic acid)), NTMP (Nitrilotris(methylene-phosphonic acid)), DTPMP (Diethylenetriamine penta(methylene-phosphonic acid)), and a salt of one or more of the afore-mentioned. The term "scale inhibitor" may also refer to a plurality of different scale inhibitors. Especially, at least HEDP is applied.

In yet another embodiment, alternatively or additionally the scale inhibitor comprises aminotris(methylenephosphonic acid) (ATMP).

The scale inhibitor may be a food grade (food approved) scale inhibitor, especially comprising a poly-phosphate compound. This is in particular advantageous if the device is intended for preparing a food or beverage, such as for instance an espresso machine, a soup maker or a food steamer.

The scale inhibitor is for example applied by a dosing element, which may contain a tablet, a pellet, or any other scale inhibitor type comprising solids, such as granules, etc. Alternatively, the scale inhibitor dosing element may be configured to contain a liquid comprising the scale inhibitor. Hence, especially at least during use of the device, the scale inhibitor dosing element contains the scale inhibitor. In some embodiments, the scale inhibitor may be provided in the dosing element during production of the device.

The scale inhibitor dosing element may be configured as flow-through element. In general, there are two options that can be used to introduce the scale inhibitor. In a first arrangement, a separate element may provide the scale inhibitor, especially at a constant amount or flux, to the water substantially independent of the flow (or velocity) of the water through the device. In a second arrangement, the scale inhibitor dosing element may provide the (amount of) scale inhibitor based on the flow of the water through the device (see below).

As mentioned above, the scale inhibitor dosing element may only need to be filled or provided once during the lifetime of the device or appliance. Lifetimes of domestic appliance may e.g. be in the range of 5 to 7 years. Hence, the invention may contribute to a maintenance free domestic appliance (at least with respect to scale formation reduction and/or inhibition), wherein refilling the scale inhibitor dosing element may not be necessary, or optionally only a few times, like 2 to 10 times during the lifetime of the appliance.

The scale inhibitor may be present in the inhibitor dosing element as a coarse-grained powder, optionally in a fine-mesh envelope. The fine-mesh envelope allows, on the one hand, a satisfactory interaction between the water and the powder and, on the other hand, precludes that the powder itself can obstruct the flow path. Preferably, however, the inhibitor is provided in the inhibitor dosing element in the form of a compressed pellet. In specific embodiments, such a pellet may be accommodated in an envelope, which consists either partly, or completely of a fine-mesh material. This may especially be relevant in the case of a flow-through inhibitor dosing element.

The scale inhibitor dosing element may furthermore comprise a metering unit configured to provide a controlled amount of scale inhibitor or descaling liquid comprising such scale inhibitor to the water. Such embodiment may especially be relevant when a liquid scale inhibitor is applied.

Especially, the scale inhibitor dosing element may be configured to maintain a predetermined minimum and/or maximum concentration of the scale inhibitor in the water (downstream of the scale inhibitor dosing unit), for instance in the range of 0.1 to 10 ppm (especially for the liquid in the heating unit).

The ion exchange filter for example comprises an ion exchange resin which is an insoluble structure or matrix that essentially acts as a medium for ion exchange. Ion exchange resins may decalcify water by substituting calcium and magnesium ions with other ions, such as sodium or potassium ions. The resin may hold these other ions at its active sites, and when being contacted with water comprising calcium and/or magnesium ions, one or more of the ions may replace (at least part of) the ions at the active sites. The resin may in embodiments be regenerated (recharged or reactivated) by contacting it with a solution comprising the other ions in a high concentration (wherein e.g. the calcium and or magnesium ions are replaced at least partly by the other ions again). The resins may be divided in four main types that differ in their functional groups: strongly acidic resins, typically comprising sulfonic acid groups; strongly basic resins, typically comprising quaternary amino groups; weakly acidic resins, typically comprising carboxylic acid groups; and weakly basic, typically comprising primary, secondary, and/or tertiary amino groups. Acidic resins may especially be relevant for softening water.

The ion exchange resin may especially comprise a weakly acidic resin. In further embodiments, the ion exchange resin may comprise a combination of the different resin types. The ion exchange resin may e.g. comprise a weakly acid resin and a strongly acid resin or e.g. the ion exchange resin may comprise a combination of resins with different active sites (combined, or e.g. configured fluidly in series). The terms "ion exchange element" and "ion exchange resin" may relate to a plurality of ion exchange elements and/or a plurality of ion exchange resin, respectively.

The ion exchange element may also be configured as a flow-through element, having a fluid input and a fluid output, wherein water exiting from the output comprises a reduced amount of calcium (and optionally magnesium) ions relative to water entering the input. The ion exchange element may be arranged upstream of the heating unit as shown in the examples above, but it may be incorporated into the heater.

The ion exchange filter may be removed for regeneration or for replacement, or it may be fixed, as explained above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A device, comprising:
    a source of water;
    a water heating system to heat water from the source of water;
    a flow control system to control a flow of water from the source of water;
    a first output to deliver hot water;
    a second output to deliver steam;
    a first hydraulic circuit extending from the source of water to the first output, comprising a first filter; and
    a second hydraulic circuit extending from the source of water to the second output, comprising a second filter,
    wherein the first filter comprises a scale inhibitor dosing element to dose a scale inhibitor to inhibit growth of calcium crystals and the second filter comprises an ion exchange filter.

2. The device of claim 1, wherein the source of water comprises a single water reservoir.

3. The device of claim 1, wherein the flow control system comprises a pump which is shared between the first hydraulic circuit and the second hydraulic circuit.

4. The device of claim 3, wherein the first filter and the second filter are part of a filter unit which is downstream of the pump, the filter unit comprising:
    a first water input and a first water output for the first filter; and
    a second water input and a second water output for the second filter, and
    wherein the device further comprises a flow control valve as well as the pump between the source of water and the filter unit.

5. The device of claim 1, wherein the flow control system comprises a first pump in the first hydraulic circuit and a second pump in the second hydraulic circuit.

6. The device of claim 1, wherein the water heating system comprises a heater which is shared between the first hydraulic circuit and the second hydraulic circuit.

7. The device of claim 1, wherein the water heating system comprises a first heater in the first hydraulic circuit and a second heater in the second hydraulic circuit.

8. The device of claim 1, wherein the first filter and the second filter are part of a filter unit which is removable from the device, having a single water input and a first flow output and a second flow output downstream of the first filter and the second filter, respectively.

9. The device of claim 1, wherein the first filter and the second filter are separate filter units which are each removable from the device, each with a respective water input and a respective water output downstream of the filter.

10. The device of claim 1, wherein the first filter is a built-in filter not intended for replacement by a user of the device and the second filter is removable from the device, wherein each filter has a respective water input and a respective water output downstream of the filter.

11. The device of claim 1, wherein the first filter and the second filter are built-in filters not intended for replacement by a user of the device.

12. The device of claim 1, wherein the first hydraulic circuit further comprises an ion exchange filter material.

13. The device of claim 1, further comprising a domestic appliance selected from a group consisting of a coffee maker, an espresso machine and a cappuccino maker, each having a coffee brew circuit, wherein the first output is used for the coffee brew circuit and the second output is used for delivering steam or for delivering hot water for non-coffee beverages.

14. The device of claim 1, wherein:
the first, scale inhibitor, filter doses a food approved scale inhibitor comprising a poly-phosphate or poly-phosphonate compound; and
the second, ion exchange, filter comprises an ion exchange polymer resin filter.

15. A method of generating hot water and steam, comprising:
controlling a flow of water from a source of water to a water heating system;
delivering hot water from a first output using a first hydraulic circuit which extends from the source of water to the first output, wherein the first hydraulic circuit comprises a first filter; and
delivering steam from a second output using a second hydraulic circuit extending from the source of water to the second output, wherein the second hydraulic circuit comprises a second filter,
wherein the first filter comprises a scale inhibitor dosing element for dosing a scale inhibitor for inhibiting growth of calcium crystals and the second filter comprises an ion exchange filter.

\* \* \* \* \*